(12) United States Patent
Dubinsky

(10) Patent No.: US 6,470,275 B1
(45) Date of Patent: Oct. 22, 2002

(54) ADAPTIVE FILTERING WITH REFERENCE ACCELEROMETER FOR CANCELLATION OF TOOL-MODE SIGNAL IN MWD APPLICATIONS

(75) Inventor: Vladimir Dubinsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 93 days.

(21) Appl. No.: 09/712,066

(22) Filed: Nov. 14, 2000

(51) Int. Cl.$^7$ ................................................. G01V 1/48
(52) U.S. Cl. ............................................ 702/9; 702/17
(58) Field of Search ........................... 702/7, 6, 14, 17, 702/9, 11; 367/43, 46, 73

(56) References Cited

U.S. PATENT DOCUMENTS

| | | | |
|---|---|---|---|
| 5,639,997 A | 6/1997 | Mallett | 181/102 |
| 5,780,784 A | 7/1998 | Robbins | 181/102 |
| 5,886,303 A | 3/1999 | Rodney | 181/102 |

*Primary Examiner*—Donald E. McElheny, Jr.
(74) *Attorney, Agent, or Firm*—Madan, Mossman & Sriram, P.C.

(57) ABSTRACT

A method for eliminating the tool mode signal from a received combined signal including both tool mode and formation mode components, uses a signal from a reference receiver that is consists primarily of the tool mode signal. A transfer function is derived relating the time reversed combined signal and the time reversed reference signal and used to predict the tool mode portion of the combined signal. Subtracting the predicted tool mode portion of the combined signal from the combined signal gives an estimate of the formation mode component.

22 Claims, 6 Drawing Sheets

ADAPTIVE FILTERING WITH REFERENCE ACCELEROMETER FOR CANCELLATION OF TOOL-MODE SIGNAL IN MWD APPLICATIONS

BACKGROUND OF THE INVENTION

1. Field of the Invention

This invention relates generally to systems for drilling boreholes for the production of hydrocarbons and more particularly to a drilling system having an acoustic measurement-while-drilling ("MWD") system as part of a bottomhole assembly for measuring acoustic velocities of subsurface formations during drilling of the wellbores and determining the location of formation bed boundaries around the bottomhole assembly. Specifically, this invention relates to use of adaptive filtering of acoustic signals for suppression of tool mode signals.

2. Description of the Related Art

Acoustic measurements have been used in wireline borehole logging for the past four decades. The first wireline acoustic instruments or "tools" were single transmitter and receiver devices which were sed to measure the velocity of the first arrival component of an acoustic wave pulse transmitted through the penetrated formation. This component was usually the compressional or "P" wave component. The velocity measurement, or more precisely the travel time of the wave component from the transmitter to the receiver, was used to compute formation porosity in formation evaluation applications. In addition, early acoustic logs were used in the conversion of seismic data, initially measured in the time domain, into the depth domain thereby yielding cross sectional displays of geological structure used in the industry as a guide to exploration and development drilling.

During the late 1960s and early 1970s, acoustic wireline devices became more complex and also yielded additional information. In the area of formation evaluation, multiple transmitters and receivers were introduced to reduce the adverse effects of the borehole upon the formation acoustic measurements. In the late 1970s, as the transmission rates of wireline telemetry systems increased, the full wave form of the received signal, rather than just the first arrival time, was measured at a plurality of receivers spaced axially along the primary axis of the logging tool. The analog signals were digitized downhole and digitized wave forms were transmitted to the surface for processing. Processing involved the extraction of the travel times of the compressional and shear components, as well as various tube wave components. In addition, the amplitudes of the various wave train components were determined. In formation evaluation, the full wave form information was used to obtain a more accurate and precise measure of formation "acoustic" porosity. In addition, mechanical properties of the formation were determined by combining amplitudes of the various components of the measured acoustic wave form. This information was used to optimize subsequent drilling programs within the area, to aid in the design of hydraulic fracturing programs for the drilled well, and to greatly increase the accuracy and precision of the conversion of area seismic data from the time into the depth domain.

Much effort in the design of acoustic wireline logging tools was, and today still is, directed toward the minimization of acoustic energy transmitted directly through the body of the downhole instrument. The arrival of this energy component at the receiver or receivers usually occurs before the arrival of energy whose path traverses the formation and the borehole. The travel path is more direct and therefore shorter. In addition, the body of the tool is usually metallic and exhibits a faster acoustic travel time than the formation and the borehole. Since the latter arrivals contain parametric information of interest, the former is considered to be interference or "noise". This direct component is reduced and/or delayed by using a variety of techniques. The component is reduced by acoustically isolating transmitters and receivers from the tool body as much as possible. The arrival of this component is delayed, preferably until after the arrival of components from the formation and borehole, by increasing the effective travel path by cutting a series of alternating slots in the metallic tool body between the transmitter and receiver arrays. This portion of the tool body is commonly referred to as the isolation subsection or "isolator sub". In addition, various mathematical techniques have been used in the processing of full wave form data to remove the direct component of the received wave form.

In addition to noise generated by the direct transmission of acoustic energy through the wireline tool body, additional acoustic noise is generated as the tool is conveyed along the borehole wall. This noise is commonly referred to as "road noise". The adverse effects of road noise are minimized using mechanical and mathematical techniques. The prior art teaches the use of many types of roller mechanical devices whereby the wireline tool is "rolled" rather than "dragged" along the borehole wall thereby reducing the magnitude of the road noise. In addition, since road noise is essentially incoherent, various mathematical methods are used in the processing of full wave form data to greatly reduce the effects of road noise.

The economic, technical, operational and safety advantages of measuring geophysical parameters as well as drilling management parameters, during actual drilling of the borehole were recognized in the early 1950s. Commercial MWD became available in the late 1970s and early 1980s. These measurements included directional information and a limited number of formation evaluation type services. Additional sensors and devices have been added during the intervening time period. In many respects, the sophistication of the sensors are comparable to their wireline counterparts in spite of the harsh conditions experienced in using such sensors in the drilling environment. It is feasible, at least in principle, to utilize multiple sensor combination measurement methods developed for wireline tools to obtain new and improved parametric measurements while drilling. Furthermore, it is feasible, in principle, to utilize additional sensors responding to drilling related parameters simultaneously with formation evaluation type sensors.

Wireline acoustic technology has been particularly difficult to adapt to MWD applications. In addition to road noise generated by the drilling assembly dragging against the wall of the borehole, there is an additional source of noise generated by the rotation of the drill bit and the drill string. Further, the slotted isolation sub technique used to isolate transmitters and receivers in wireline applications can not be used in MWD applications in that such slots would mechanically weaken the MWD acoustic subassembly to the failing point.

U.S. Pat. No. 5,780,784 to Robbins discloses a system for eliminating the tool mode signal from a received combined signal comprising both tool mode and formation mode components. A first receiver receives a signal that is a combination of the desired formation signal and the tool mode signal. A reference receiver is used for receiving a signal consisting primarily of the tool mode signal. A predictive filter is used to predict the tool mode component of the signal received by the first receiver on the basis of the reference signal, and this predicted signal is subtracted from the combined signal received by the first receiver.

A problem associated with adaptive predictive filtering is that it typically takes several cycles (transient time) of the tool mode signal for the parameters of the adaptive filter to attain values wherein the filtering becomes effective. The problem is exacerbated when the signal is non-stationary, as it is in acoustic logging. The non-stationarity means that the derivation of the adaptive filter is tracking a moving target. In acoustic logging, the early portion of the formation signal is of utmost importance and this transient time means that the suppression of the tool mode may be relatively ineffective for getting a good estimate of the inception of the formation signal. It is desirable to have a method of suppression of the tool mode signal that is effective in obtaining good estimates of the early portion of the formation signal. The present invention satisfies this need.

SUMMARY OF THE INVENTION

The present invention provides a method of suppressing the tool mode signal in an acoustic MWD assembly. An accelerometer mounted on the drillstring measures a signal that is dominated by the tool mode. This reference signal is used to obtain an estimate of the tool mode component of the signal received by a plurality of acoustic sensors on the acoustic MWD.

In one embodiment of the invention, an acoustic source is actuated on the logging tool generating both a tool mode that propagates through body of the tool and a formation mode that propagates through the borehole fluid into the formation, through the formation and back through the borehole to the tool. A hydrophone on the tool detects a signal that is a combination of the formation mode signal and the tool mode signal. A reference accelerometer proximate to the hydrophone measures a signal that is dominated by the tool mode. An adaptive filter is derived for attenuation of the tool mode component of the signal received by the hydrophone. A novel feature of the invention is that the derivation and application of the filter is done on time-reversed versions of the accelerometer and hydrophone signals.

In another aspect of the invention, the filter derivation is based upon deriving from the cross-spectral density of the reference and hydrophone signals, a transfer function relating the two signals, modifying the transfer function by zeroing out components where the spectral values of the transfer function lie below a threshold, and using the modified transfer function for removing the tool mode component from the hydrophone signal.

In another embodiment of the invention, a multiple band-reject filter is derived based upon frequency sub-bands in which the reference signal exceeds a predetermined threshold. The multiple band-reject filter is then applied to the hydrophone signals.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

In general, the present invention provides an apparatus for making measurements of formation acoustic properties during the drilling of a borehole. The drilling system contains a drill string having a downhole subassembly that includes a drill bit at its bottom end and a plurality of sensors and MWD devices, including an acoustic MWD system having a first set of acoustic sensors for determining the formation acoustic velocity while drilling the borehole. A downhole computer and associated memory are provided for computing various downhole operating parameters, to map the formation around the downhole subassembly, to update stored models and data as a result of the computed parameters and to aid the driller in navigating the drill string along a desired wellbore profile.

The system of the invention also preferably includes devices for determining the formation resistivity, gamma ray intensity of the formation, the drill string inclination and the drill string azimuth, nuclear porosity of the formation and the formation density. The drill string may contain other MWD devices known in the art for providing information about the subsurface geology, borehole conditions and mud motor operating parameters, such as the differential pressure across the mud motor, torque and the condition of the bearing assembly. Selected data is transmitted between the downhole subassembly and surface computing apparatus via a two-way telemetry system. The surface computing apparatus transmits signals to the downhole subassembly for controlling certain desired operations and also for processing the received data according to programmed instruction to improve the drilling operations.

Figure 1:
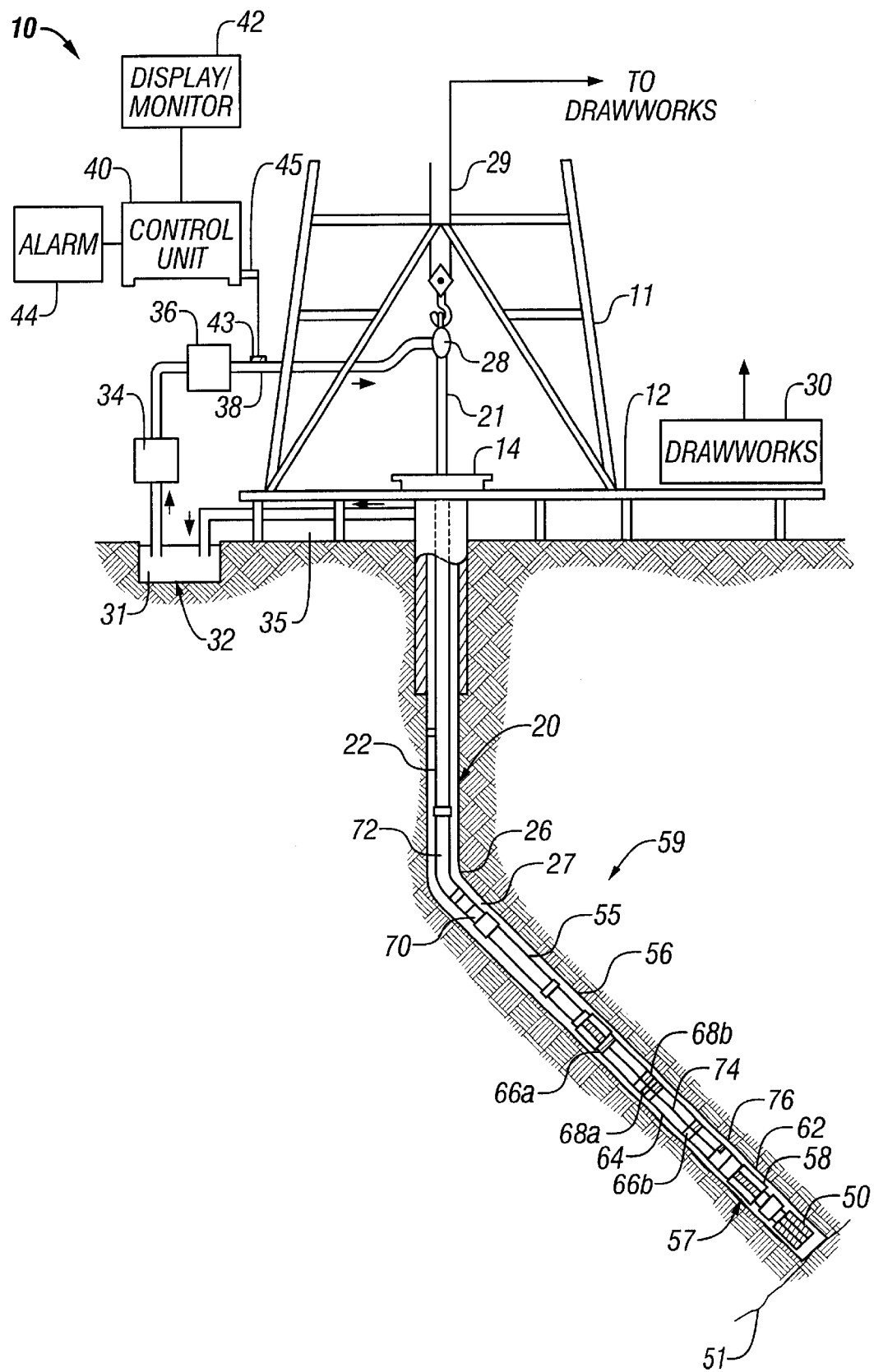
FIG. 1 shows a schematic diagram of a drilling system having a drill string that includes an acoustic sensor system according to the present invention.

FIG. 1 shows a schematic diagram of a drilling system 10 having a downhole assembly containing an acoustic sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In the preferred embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 64 is preferably coupled above the lower kick-off subassembly 62 that provides signals, from which resistivity of the formation near or in front of the drill bit 50 is determined. One resistivity measuring device is described in U.S. Pat. No. 5,001,675, which is assigned to the assignee hereof and is incorporated herein by reference. This patent describes a dual propagation resistivity device ("DPR") having one or more pairs of transmitting antennae 66a and 66b spaced from one or more pairs of receiving antennae 68a and 68b. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that is preferably placed in a housing 70 above the mud motor 55 and transmitted to the surface control unit 40 using a suitable telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

Figure 2:
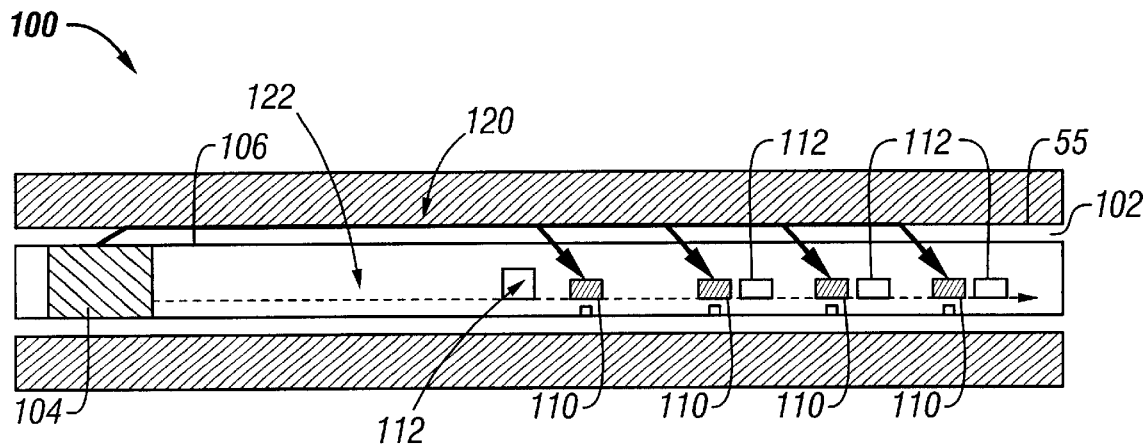
FIG. 2 shows a functional block diagram of the major downhole elements of the system shown in FIG. 1.

FIG. 2 is a schematic diagram of an acoustic sensing device that may be located at any suitable location in the downhole subassembly. Shown is a borehole 55 within an earth formation 100 with the body 106 of the acoustic subassembly. A transmitter 104 on the body 104 of the acoustic subassembly produces acoustic signals that travel through the annulus 102 between the body 104 and the borehole wall 55, taking the path indicated by 120 and travels back to the body to be detected by receivers 110. In one embodiment of the invention, the transmitter 104 is designed as a so-called monopole transmitter emitting primarily compressional waves; in such a case, the receivers 110 are preferably hydrophones. By analysis of the signals received by the receivers indicative of acoustic energy that has traveled along the path 120, information can be obtained about the compressional velocity and other properties of the formation 100. Also located on the tool body are reference sensor 112, preferably an accelerometer, that is responsive primarily to the tool mode signal. The accelerometer may be sensitive to radial motion or to a combination of radial and axial motion. In a preferred embodiment of the invention, a reference sensor is located in proximity to each of the hydrophones.

Not shown in FIG. 2 to simplify the illustration are the path for the flow of fluids through the drilling assembly to the drillbit: commonly, the acoustic subassembly is arranged so that the drillbit (50 in FIG. 1) is on the side of the transmitter that is away from the receivers.

Also shown in FIG. 2 is a path 122 that corresponds to acoustic signals passing through the body 106 of the acoustic subassembly. These so-called "tool mode" signals are generated by the transmitter 104. In addition, the tool mode signals also include signals generated by the drillbit as it is rotating and other signals produced by the flexing of the drillstring. The signals that propagate through the formation along the raypath 120 are commonly referred to as the formation signals. The transmitter may be a monopole transmitter, such as a transducer that generates a pressure pulse upon excitation, or ir may be a dipole or quadrupole transmitter. Such dipole and quadrupole transmitters would be known to those versed in the art and are not discussed further. When using a dipole or quadrupole transmitter, a single accelerometer is sufficient to use as a reference sensor. However, it is preferable that the reference sensor be designed for dipole signals and quadrupole signals and comprises a matched pair of accelerometers or four accelerometers disposed circumferentially around the tool (not shown). Such dipole and quadrupole transmitters are disclosed in copending U.S. patent application Ser. No. 09/590, 906, the contents of which are fully incorporated herein by reference.

In one embodiment of the invention, the portion of the downhole subassembly including the acoustic sensing device 100 is lowered into a tank of water and the source 104 is activated. In this case, there is no formation signal, so that the reference sensor and the receivers 110 are responding primarily to the tool-mode signal. Denoting by $A(t)$ the signal received by the reference sensor 112 and by $H_i(t)$ the signal received by the i-th receiver 110, a filter $T_{ah,i}(t)$ may be defined relating the reference sensor signal to the i-th receiver signal as $$H_i(t)=A(t)*T_{ah,i}(t) \quad (1)$$

where * is a convolution operator.
Equivalently, in the frequency domain, $$H_i(\omega)=A(\omega) \cdot T_{ah,i}(\omega) \quad (2)$$

The transfer function obtained in this fashion may be used as for the filters used for processing the signals as described below. In a preferred embodiment of the invention, the filters are implemented as digital filters. Implementation may be either as finite impulse response (FIR) or infinite impulse response (IIR) filters as the terms are understood by those versed in the art. The derivation of the filters is given later in the specifications.

Once the filter $T_{ah,i}(t)$ has been determined the logging tool may be used in the borehole. Under borehole conditions, the signal received by the i-th receiver will consist of both formation and tool mode signals. An estimate of the formation mode signal under these conditions may be obtained as $$\hat{H}_i(t)=H_i(t)-T_{ah,i}(t)*A(t) \quad (3)$$

where * is a convolution operation, or, equivalently in the frequency domain, $$\hat{H}_i(w)=H_i(w)-T_{ah,i}(w) \cdot A(w) \quad (4)$$

Such a method has been suggested by Robbins. One embodiment of the present invention differs from that taught in Robbins in the manner in which the filter is derived.

This is discussed below with reference to FIGS. 3 and 4. However, as noted by Robbins, a fixed value of $T_{ah,i}(t)$ is not entirely satisfactory: the borehole pressure, temperature and other factors cause gradual variations in the transmission of tool mode signals.

Accordingly, in a preferred embodiment of the invention, the filter is derived adaptively while the tool is in a borehole.

However, a major difference between the present invention and the teachings of Robbins is that in the present invention, the filter is derived from time-reversed tool mode and formation mode signals. This avoids the problem encountered in conventional predictive filtering with a transient period in the filter derivation during which the predicted value of the tool mode component of the hydrophone signal may be significantly in error. From a practical standpoint, deriving and applying the filter to the reversed time signals means that the filter has reached a stable value near the portion of the formation mode signals that are of greatest interest-near the first arrival of the formation mode signal.

Figure 3:
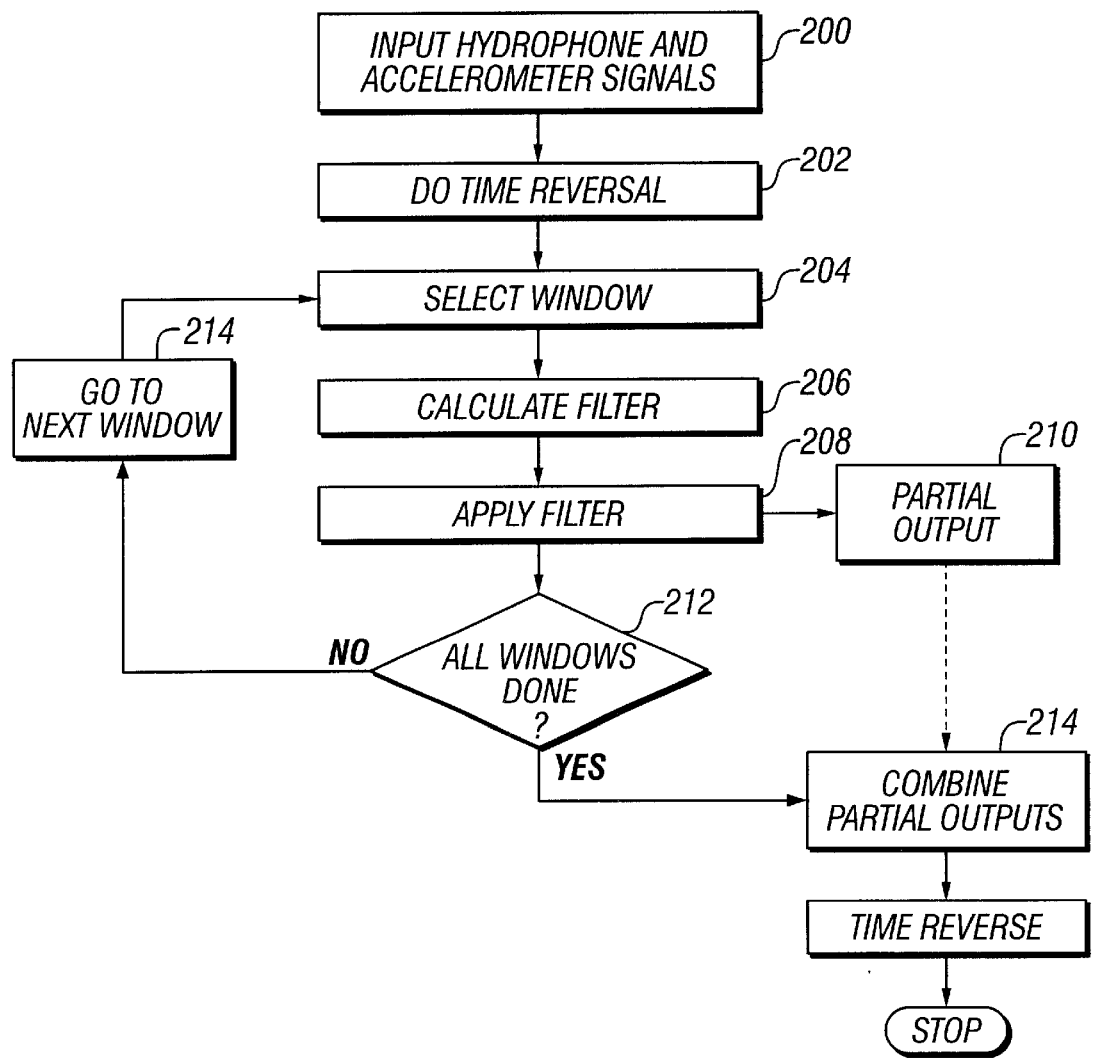
FIG. 3 is a flow chart illustrating the broad steps of the invention.

The preferred method is schematically illustrated in FIG. 3. The process starts with the recorded signals hydrophone signals and reference accelerometer signals H(t) and A(t) 200. For convenience, the method is discussed with reference to a single hydrophone and an associated accelerometer, though in actual practice, there could be a plurality of hydrophones and accelerometers. The signals are time reversed 202. For convenience, the time reversed signals may be denoted by $H(\tau)$ and $A(\tau)$. Typically, 5–10 ms. of data would be used in the processing.

Next, an initial window having a length much shorter than the recorded length of the data is selected and a Hanning weighting is applied to the time reversed accelerometer and hydrophone signals. A Hanning weighting is preferred, though other types of weighting having a shape similar to the bell-shape of the Hanning weighting may also be applied. The length of the initial window is typically 0.2 ms. and for this window, a filter is derived 206 as described below. The filter is applied 212 to the accelerometer and hydrophone signals as described below, and a partial output trace segment 210 is saved. A check is made to see if all the windows have been processed 212 and, if they have not, the next data window (still in reversed time) is selected 214 and processing starts again at 204. Successive windows are, in the preferred embodiment, chosen with a 50% overlap. Once all the windows have been processed, the saved partial outputs from 210 are combined 214 to produce a single, filtered output that is indicative of the formation mode signal in reversed time. The process of combining in a preferred embodiment of the invention comprises averaging the partial outputs from successive windows over their overlap region. Finally, the filtered output is reversed 216 to produce an estimate of the formation mode signal.

Figure 4:
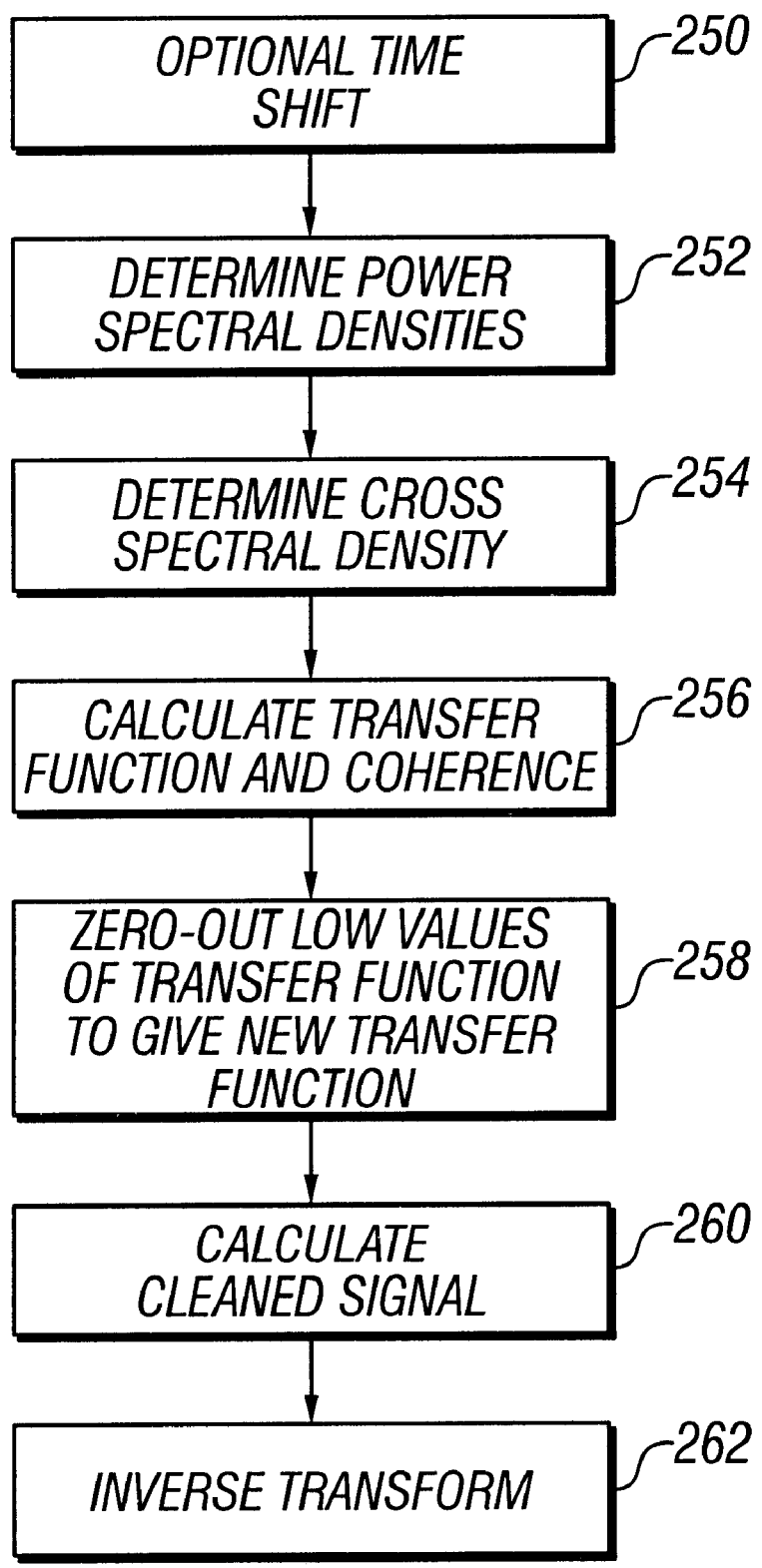
FIG. 4 is a flow chart illustrating in further detail the steps of filter derivation and application in FIG. 3.

The following steps are performed in the filter derivation and application 206, 208 and are illustrated by the flow chart of FIG. 4:

1. If necessary, apply a time shift 250 to the time reversed signals $H(\tau)$ and $A(\tau)$. This time shift is a common value applied to all the windows and may be derived by a cross correlation of the hydrophone and accelerometer signals.

2. Determine the power spectral densities $P_{hh}(\omega)$ and $P_{aa}(\omega)$ 252 as $P_{hh}(\omega)=|F\{H(\omega)\}|^2$ and
   $P_{aa}(\omega)=|F\{A(\tau)\}|^2$ where $\|$ denotes absolute value and $F\{\cdot\}$ denotes the Fourier Transform.

3. Determine the cross-spectral density P ah ($\omega$) 254 as $P_{ah}(\omega)=F\{A(\tau)\}F\{H(\tau)\}^*$, where

* is the complex conjugate.

4. Calculate the complex transfer function $T_{ah}$ and the coherence $C_{ah}$ 256 between A and H as $T_{ah}=P_{ah}/P_{hh}$, and $C_{ah}=|(P_{ah})|^2/(P_{hh}\cdot P_{aa})$ 5. Zero out the transfer function components 258 which corresponds to a low value (below a predetermined threshold) to get a new transfer function $T'_{ah}$ to be used for noise reduction.
6. Calculate "cleaned" signal 260 in frequency domain: H'(ω)) as $H'(\omega)=F\{H(\tau)\}-T'_{ah}F\{A(\tau)\}$ The second term on the right is a predicted value of the time reversed tool mode component of the time reversed hydrophone signal 7. Inverse transform the cleaned signal back to the (reverse) time domain 262

$H'(\tau)=F^{-1}\{H'(\omega)\}$ where $F^{-1}$ is the inverse Fourier transform.

The processes described above may be carried out by a downhole computer (not shown) disposed on the BHA at any suitable location. Alternatively, the signals recorded by the accelerometer and the hydrophone may be stored in a memory downhole and processed subsequently by a surface computer.

A filter such as derived above may also be used to derive a transfer function between the reference sensor and the hydrophone sensor with the tool disposed in a water tank as discussed above. This may be of particular use when the signal is non-stationary.

Figure 5A:
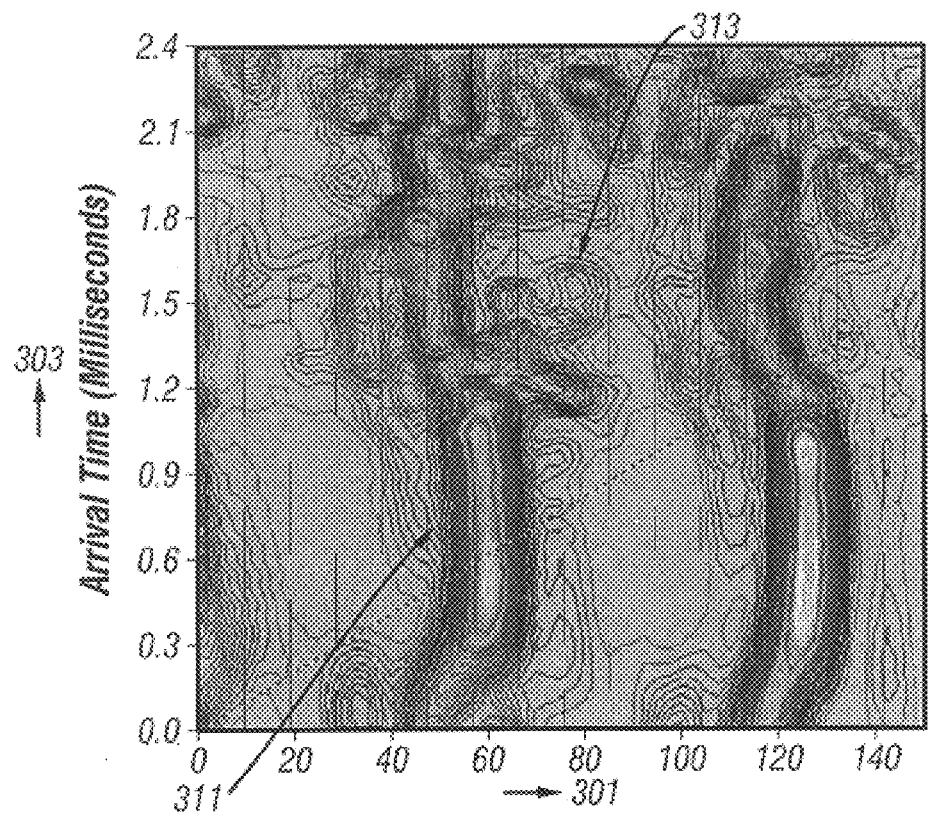
FIG. 5a shows a coherence plot of simulated hydrophone data having both a tool mode and a formation mode signal.
Figure 5B:
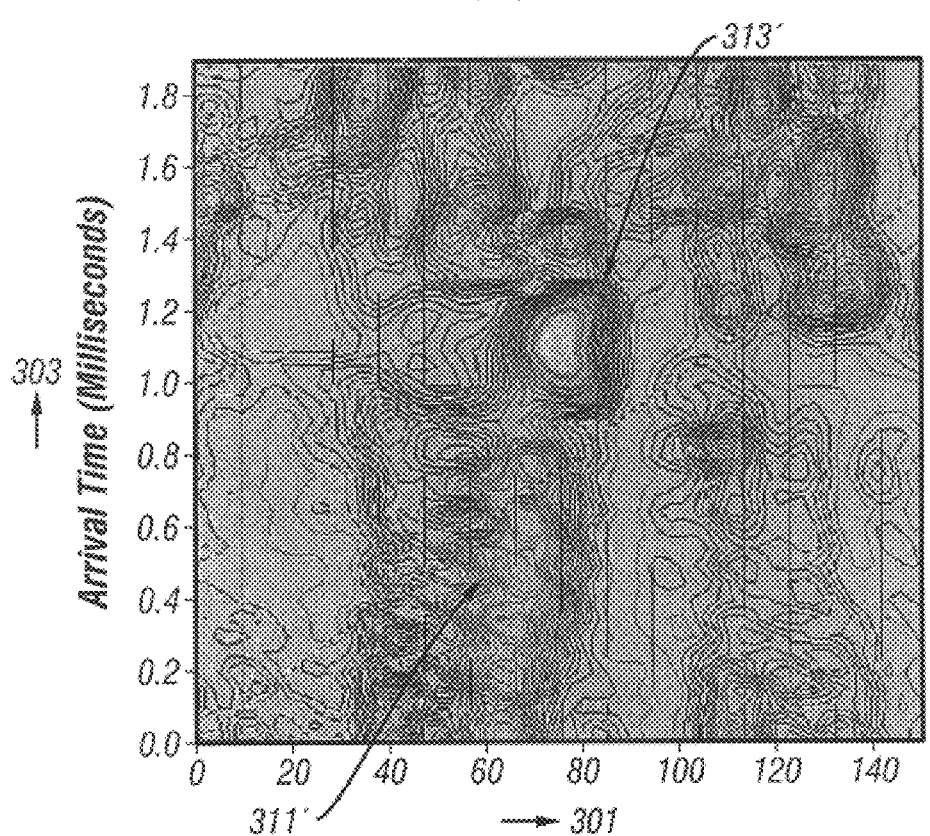
FIG. 5b shows a coherence plot of the results of filtering the simulated hydrophone data of FIG. 5a using the method of the present invention.

Turning now to FIGS. 5a and 5b, the results of using the method of the present invention on simulated data are shown. FIG. 5a shows data obtained by a finite element simulation of the tool conveyed in a borehole in a formation. The data correspond to a monopole transmitter and are in the form of a semblance plot. The abscissa 301 in both FIGS. 5a and 5b is the slowness in microseconds per foot (μs/ft) while the ordinate 303 is the arrival time in milliseconds (ms.).

The semblance plot of FIG. 5a is dominated by the tool mode arrival indicated generally by the arrow 311, while the formation mode indicated by 313 is barely discernible. After using the method of the present invention on the tool mode and formation mode signals (not shown), the semblance plot of FIG. 5b results. The tool mode arrival, indicated by the arrow 311' has been attenuated greatly relative to the tool mode arrival 311 in FIG. 5a. Consequently, the filtered formation mode arrival 313' is clearly identifiable and may be used for additional processing using known methods to obtain information about the formation parameters.

Figure 6A:
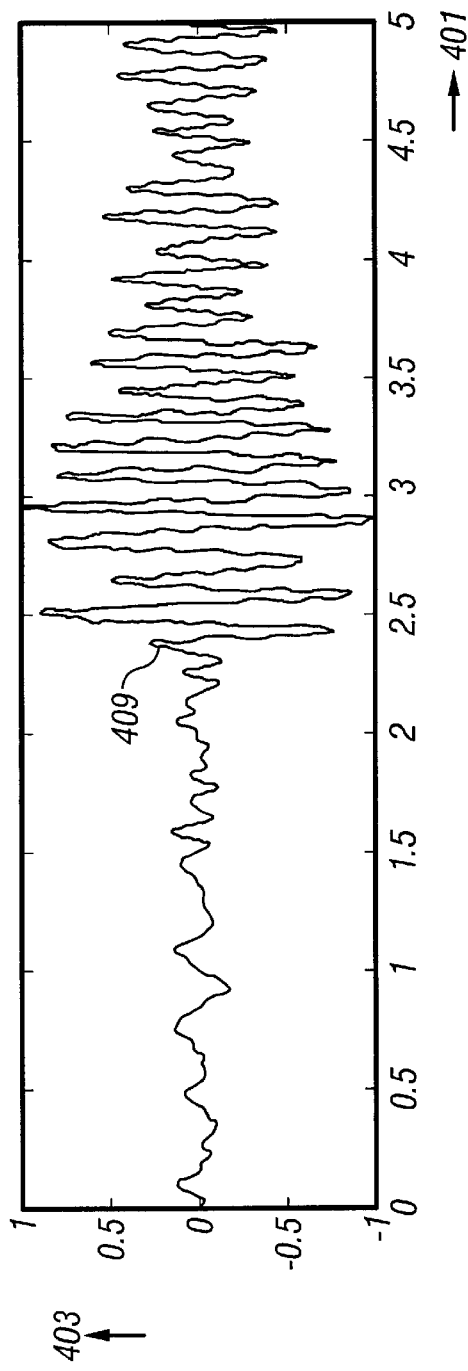
FIG. 6a is an example of data recorded using a hydrophone on a logging tool.
Figure 6B:
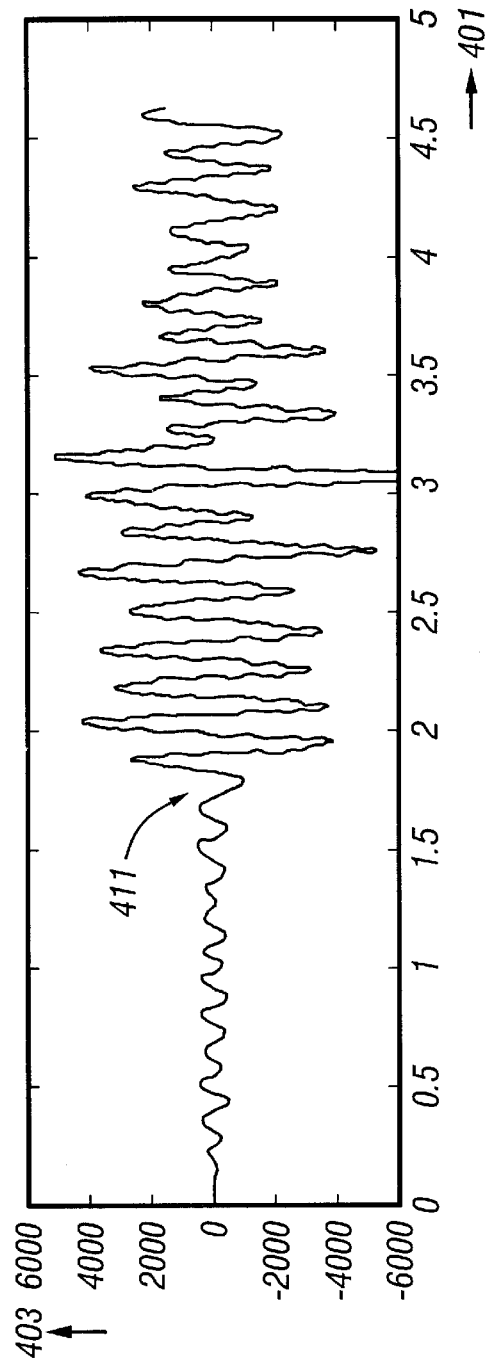
FIG. 6b shows the results of filtering the data of FIG. 6a using the method of the present invention.

Turning now to FIGS. 6a and 6b, results of using the method of the present invention on data recorded with the logging tool in a borehole are shown. The data correspond to a dipole source. FIG. 6a shows data the actual data with a hydrophone on the tool, the abscissa 401 being time (a total of 5 ms. of data are shown) and the ordinate 403 is the amplitude in arbitrary units. The recorded signal is dominated by an arrival 409 that is interpreted to be the tool mode signal. The result of filtering the hydrophone signal using the method of the present invention is shown in FIG. 6b:, as before, the abscissa 401 is time and the ordinate 403 is the amplitude of the signal. Noted that the scale in the display of FIG. 6b is ±6000 while the scale in the display of FIG. 6a is ±10⁴, i.e., the signal level in FIG. 6b is smaller than the signal level in FIG. 6a. This is due to the attenuation of the tool mode signal, as a result of which the formation signal 411 is clearly interpretable and may be used for further processing according to known methods.

Figure 7:
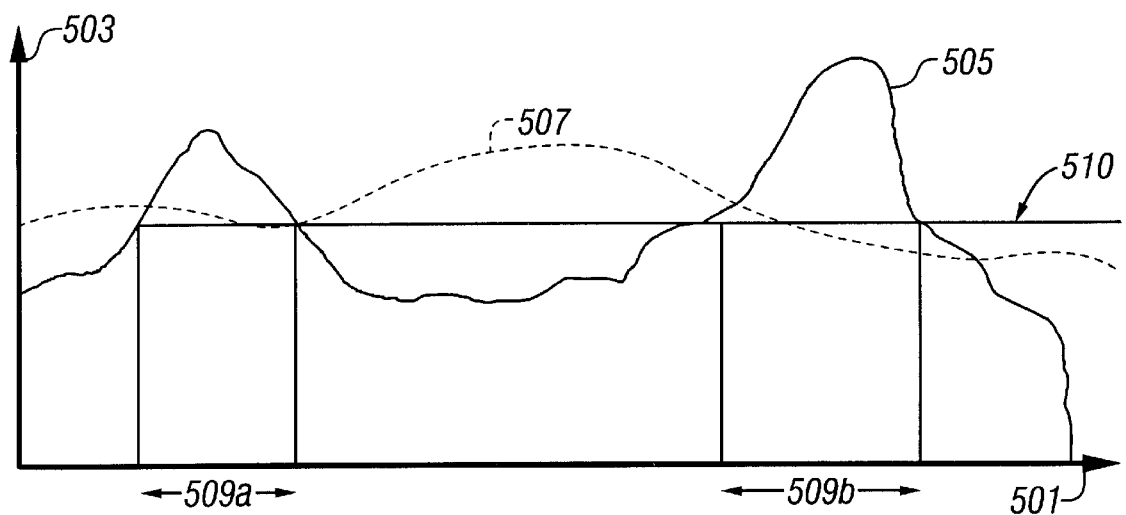
FIG. 7 illustrates another embodiment of the invention using sub-band filters.

Turning now to FIG. 7, an alternate embodiment of the method of the present invention is described. As described above, a reference signal and a hydrophone signal are obtained. These signals are Fourier Transformed to give power spectral densities as illustrated in FIG. 7, wherein 505 is the spectrum of the reference signal and 507 is the spectrum of the hydrophone signal. The abscissa 501 is frequency and the ordinate 503 is the power spectral density. A threshold 510 is specified and frequency sub-bands 509a, 509b in which the spectrum of the reference signal exceeds the threshold are determined. Only two such sub-bands are shown in FIG. 7 for illustrative purposes, although in reality there may be more such sub-bands. A band-reject filter that rejects these sub-bands is then applied to the hydrophone signal.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method for obtaining information about a formation using a logging tool conveyed in a borehole in the formation, the method comprising:

(a) activating an acoustic transmitter on a body of the logging tool and exciting a formation mode signal in the formation and a tool mode signal in the body of the logging tool;

(b) measuring a first signal consisting of primarily the tool mode signal using a first (reference) sensor on the body of the tool;

(c) measuring a second signal comprising of the tool mode signal and the formation mode signal using a second sensor (receiver) on the body of the tool;

(d) time-reversing said first and second signals giving time-reversed first and second signals;

(e) obtaining from said time reversed first and second signals a filtered signal indicative primarily of the formation mode signal.

2. The method of claim 1 wherein said acoustic transmitter is selected from the group consisting of (i) a monopole transmitter, (ii) a dipole transmitter, and, (iii) a quadrupole transmitter.

3. The method of claim 1 wherein said reference sensor comprises an accelerometer.

4. The method of claim 1 wherein said reference sensor is selected from the group consisting of (i) an accelerometer, (ii) a pair of accelerometers, and, (iii) four accelerometers.

5. The method of claim 1 wherein said second sensor is a hydrophone.

6. The method of claim 1 wherein obtaining said filtered signal further comprises deriving (i) a power spectral density of the time reversed first and second signals, (ii) a cross spectral density of the time reversed first and second signals, (iii) a transfer function relating the time reversed first and second signals, and, (iv) a coherence between the time reversed first and second signals.

7. The method of claim 6 wherein obtaining said filtered signal further comprises determining zeroing components of said transfer function that have values below a specified threshold and obtaining a modified transfer function.

8. The method of claim 7 wherein obtaining said filtered signal further comprises applying the modified transfer function to the time reversed reference signal thereby obtaining a predicted time reversed tool mode component signal.

9. The method of claim 8 further comprising subtracting said predicted time reversed tool mode component signal from the time reversed second signal.

10. The method of claim 1 wherein obtaining said filtered signal further comprises selecting a plurality of time windows of the time reversed first and second signals.

11. The method of claim 1 wherein said plurality of time windows are overlapping Hanning windows.

12. The method of claim 10 wherein obtaining said filtered signal further comprises deriving a partial filtered output for each of said plurality of windows and combining said plurality of partial filtered outputs.

13. A Measurement-while-Drilling (MWD) logging tool conveyed in a borehole in a formation for obtaining information about the formation comprising:
(a) an acoustic transmitter on a body of the logging tool for exciting a formation mode signal in the formation and a tool mode signal in the body of the logging tool;
(b) a first (reference) sensor on the body of the tool for measuring a first signal consisting of primarily the tool mode signal;
(c) a second sensor on the body of the tool for measuring a second signal comprising of the tool mode signal and the formation mode signal;
(d) a computer for time-reversing said first and second signals and obtaining therefrom a filtered signal indicative primarily of the formation mode signal.

14. The MWD logging tool of claim 13 wherein the acoustic transmitter is a monopole transmitter.

15. The MWD logging tool of claim 13 wherein said reference sensor is an accelerometer.

16. The MWD logging tool of claim 15 wherein said accelerometer is sensitive to one of (i) radial motion, and, (ii) a combination of radial and axial motion.

17. The MWD logging tool of claim 13 wherein said second sensor is a hydrophone.

18. The MWD logging tool of claim 13 wherein said computer further derives (i) a power spectral density of the time reversed first and second signals, (ii) a cross spectral density of the time reversed first and second signals, (iii) a transfer function relating the time reversed first and second signals, and, (iv) a coherence between the time reversed first and second signals.

19. The MWD logging tool of claim 13 wherein said computer further zeroes out components of said transfer function that have values below a specified threshold and obtaining a modified transfer function.

20. The MWD logging tool of claim 13 wherein said computer further applies a plurality of overlapping Hanning windows, determines a partial filtered output for each of said Hanning windows, and combines said partial filtered outputs.

21. A method for obtaining information about a formation using a logging tool, the method comprising:
(a) conveying the logging tool into a body of water;
(b) activating an acoustic transmitter on the body of the logging tool and exciting a tool mode signal in the body of the logging tool;
(c) measuring a first signal using a reference sensor on the body of the tool and a second sensor using a hydrophone on the body of the tool;
(d) time-reversing said first and second signals giving time-reversed first and second signals;
(e) deriving a transfer function relating the time reversed first and second signals;
(f) conveying the logging tool into a borehole and activating an acoustic transmitter on a body of the logging tool thereby exciting a formation mode signal in the formation and a tool mode signal in the body of the logging tool;
(g) measuring a third signal consisting of primarily the tool mode signal using said reference sensor;
(h) measuring a fourth signal comprising of the tool mode signal and the formation mode signal using said hydrophone; and
(i) obtaining from said transfer function and the third and fourth signal a filtered signal indicative of the formation made signal.

22. A method for obtaining information about a formation using a logging tool conveyed in a borehole in the formation, the method comprising:
(a) activating an acoustic transmitter on a body of the logging tool and exciting a formation mode signal in the formation and a tool mode signal in the body of the logging tool;
(b) measuring a first signal consisting of primarily the tool mode signal using a first (reference) sensor on the body of the tool;
(c) measuring a second signal comprising of the tool mode signal and the formation mode signal using a second sensor (receiver) on the body of the tool;
(d) obtaining a power spectral density (PSD) of the first signal and identifying at least one sub-band in which the PSD exceeds a predetermined threshold;
(e) deriving a filter that rejects substantially all components of signals within the at least one sub-band; and
(f) applying the derived filter to the second signal.

* * * * *